Patented Sept. 19, 1922.

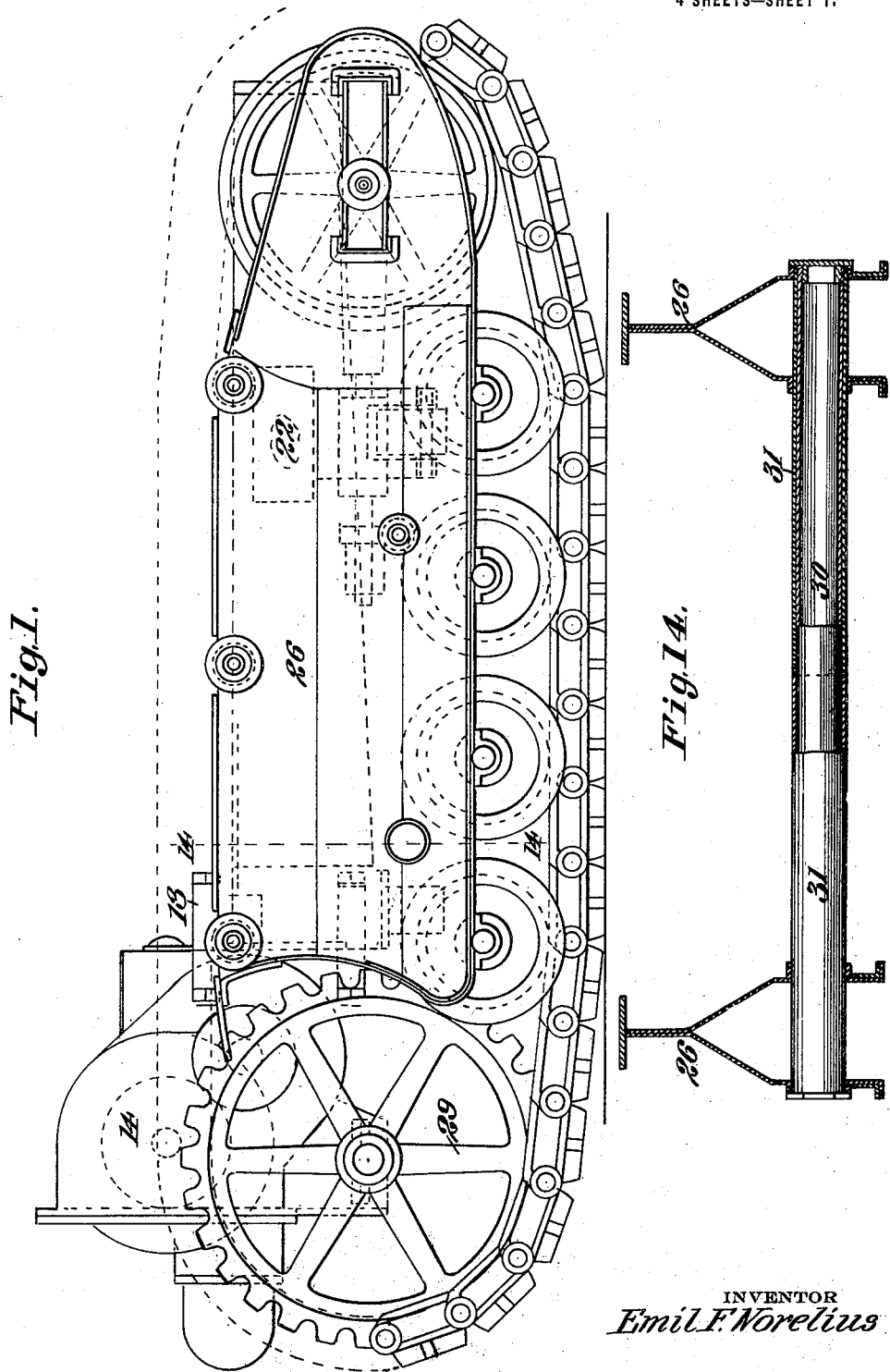

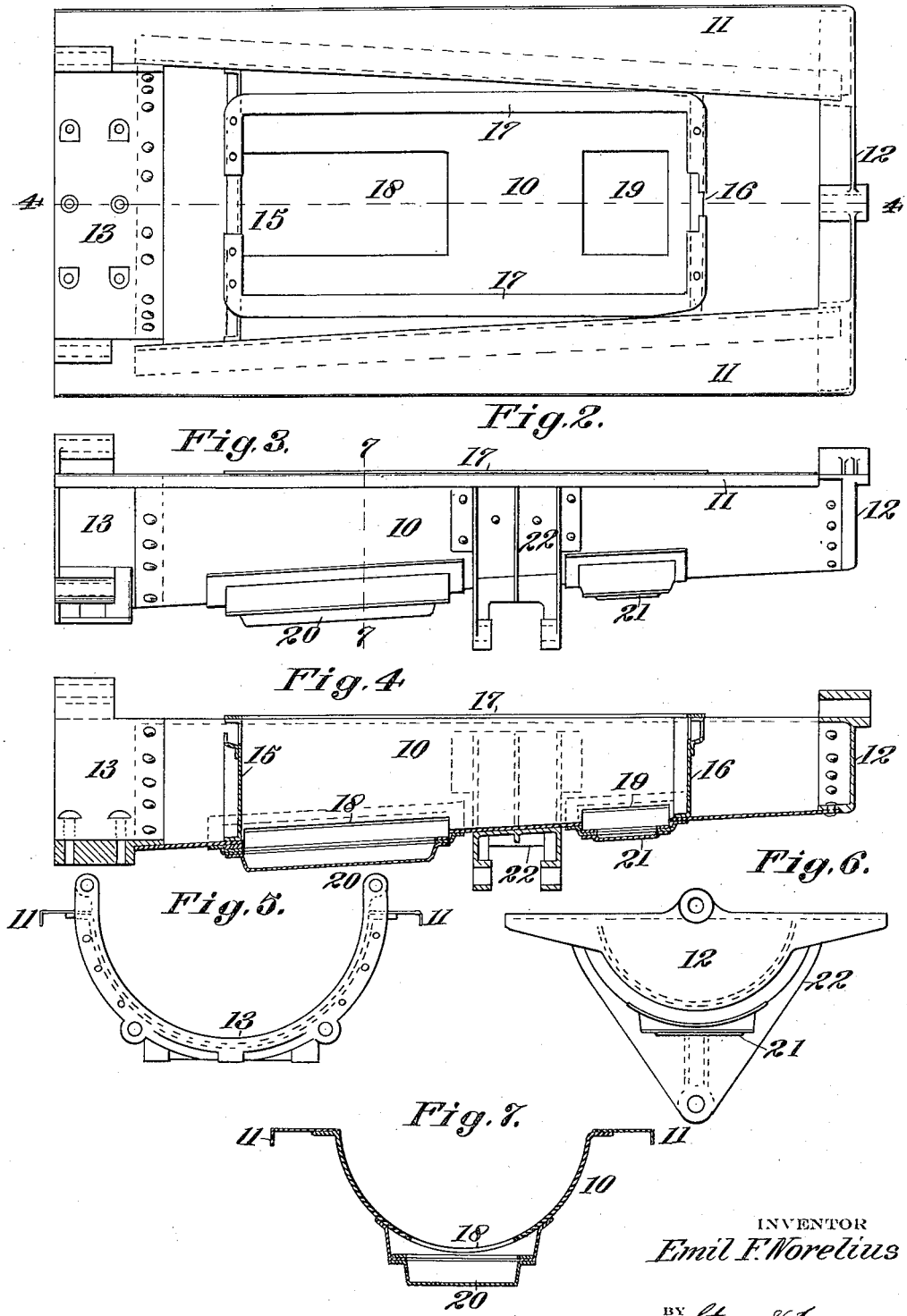

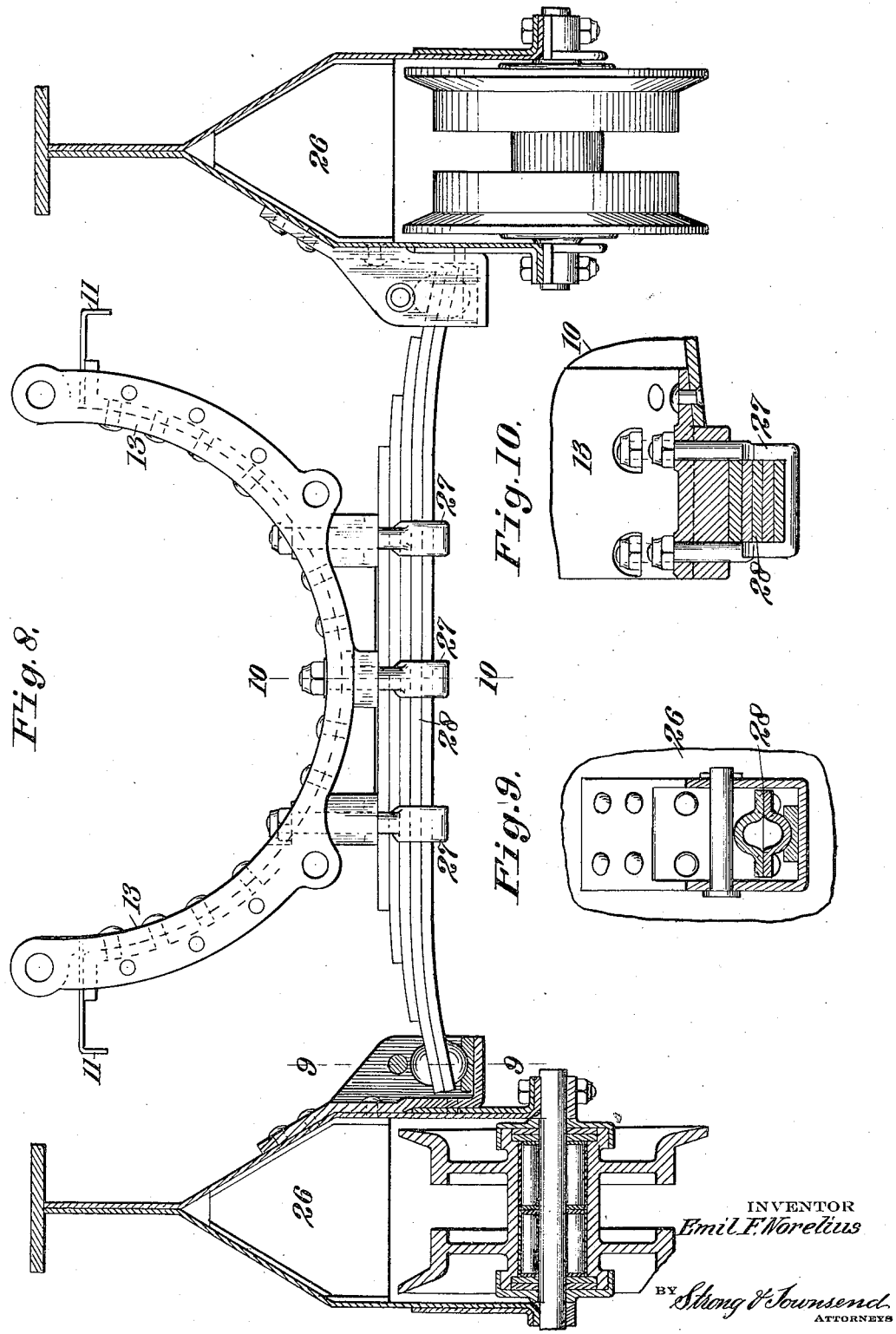

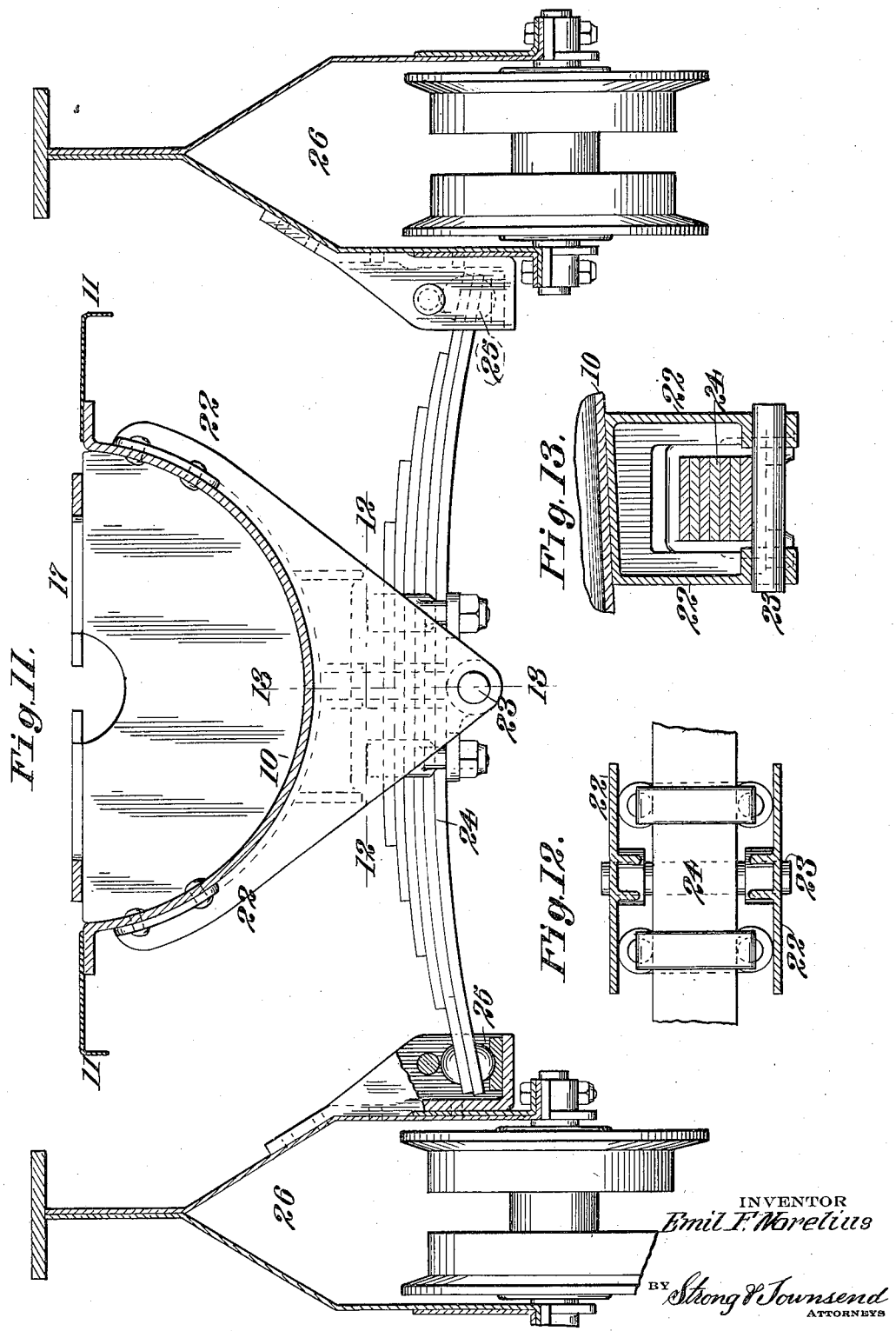

1,429,449

UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

MAIN FRAME AND SUSPENSION FOR TRACTORS.

Application filed August 27, 1919. Serial No. 320,237.

*To all whom it may concern:*

Be it known that I, EMIL F. NORELIUS, a citizen of the United States, residing at Peoria, in the county of Peoria, and State of Illinois, have invented a new and useful Improvement in Main Frames and Suspensions for Tractors, of which the following is a specification.

This invention relates to tractors of the chain track type, and more especially to a main frame and a suspension therefor.

It has for its object to produce a small tractor where light weight and neat appearance, combined with ease and facility of construction, are prime considerations.

The main frame is formed of pressed steel in such shape as to give the maximum strength, its principal distinguishing feature being a body portion having a longitudinally extended concavity reinforced and strengthened at intervals by transversely extending members, which latter also serve to support the engine and connected parts. The transmission mechanism is preferably contained in a single unit carried in the housing, which is bolted to the rear of the main frame. A three-point suspension is employed for the main frame in order to reduce strains and twisting; and by reason of the special form of suspension involved herein I am enabled to employ the pressed steel construction in the main frame. This suspension consists of a spring equalizer bar, near the front end of the main frame, and a leaf spring, near the rear end thereof, having shackle connections with the truck members.

Referring to the accompanying drawings:

Fig. 1 shows a side elevation of a tractor embodying my invention.

Fig. 2 shows a plan view of the main frame.

Fig. 3 shows a side elevation of the main frame.

Fig. 4 shows a sectional view, taken on line 4—4 of Fig. 2.

Fig. 5 shows a rear elevation of the main frame.

Fig. 6 shows a front elevation of the same.

Fig. 7 shows a cross sectional view, taken on the line 7—7 of Fig. 3.

Fig. 8 shows a rear elevation, partly in section, of the main frame, illustrating the manner of suspending it upon the truck members.

Fig. 9 shows a detail sectional view, taken on the line 9—9 of Fig. 8.

Fig. 10 shows a detail sectional view, taken on the line 10—10 of Fig. 8.

Fig. 11 shows a front elevation, partly in section, illustrating the manner of suspending the main frame upon the truck members at the forward end.

Fig. 12 shows a sectional view, taken on the line 12—12 of Fig. 11.

Fig. 13 shows a sectional view, taken on the line 13—13 of Fig. 11.

Fig. 14 shows a diagram of one method of connecting opposite truck members together, taken on the line 14—14 of Fig. 1.

The main frame is formed in its principal elements of pressed steel and consists of a body portion 10, substantially semicircular in cross section. Side rails 11 are secured to the body portion at the outer edges of the latter, said side rails being preferably formed of angle bars riveted or otherwise secured to the body portion. A front end piece 12 is employed and is of a channel shape in cross section. This piece is of heavier construction and is preferably bolted or riveted to the forward end of the body portion.

A semicircular band 13 is arranged at the rear end of the body portion, being bolted or riveted thereto. This band serves to strengthen and reinforce the body portion at the rear and also affords means for connecting a housing 14 to the main frame, said housing 14 containing the transmission mechanism.

At intervals between the front and rear end of the body portion are transverse members 15 and 16; the latter being of a shape to conform to the body portion at their lower edges and terminating at their upper edges in a plane with the side rails of the main frame. These transverse members 15 and 16, in conjunction with the front end piece 12, serve as bearing supports for the engine. To provide a smooth base for the engine, I preferably arrange bars 17, extending longitudinally between the cross members 15 and 16, and thereby eliminate the necessity of machining the main frame as a whole.

At points in the bottom of the body portion, coinciding, preferably, with the locations of the main fly-wheel and fan pulley, I have cut away the material to provide openings 18 and 19 and close these openings by means of removable caps or pans 20 and 21. These removable members provide a quick and easy means of gaining access to the fly-wheel and fan pulley or other parts which may require frequent attention.

A cross sill 22 of channel formation is secured to the main frame near the forward end of the latter and provides one of the supports for the main frame, being pivoted at 23 upon a transversely extending equalizer bar 24, which latter is connected by shackles 25 to opposite truck members 26. The equalizer bar 24, as shown herein, is in the form of a leaf spring. The rear end of the main frame is suspended, as shown in Fig. 8, where a plurality of clips 27 form a rigid connection with the transversely extending leaf spring 28, which latter is also connected by shackles to the opposite truck members. This arrangement provides in effect a three-point suspension for the main frame and reduces to a minimum the strains and twists upon the latter so that a light construction is made practicable.

The truck members 26 may be of any suitable construction and include the usual driving sprocket wheels 29 journaled on and carried by the transmission housing 14. This housing 14, as before stated, is detachably connected to the main frame by means of the rear band 13 and is preferably entirely enclosed. The present invention is not concerned with the particular form of the housing nor of the truck members, special applications having been filed to cover the novelty disclosed in the latter.

As a result of the construction described in the foregoing I am able to produce a light, small and inexpensive tractor and one presenting a neat appearance and affording a maximum protection for the operating parts. There is a minimum of machine work involved in the construction of the main frame and since its principal elements are formed of pressed steel it is possible to manufacture at comparatively high speed; the main frame being of the shape described and entirely enclosed at its bottom affords special protection to the engine and other operating parts.

The three-point suspension shown herein has special value in connection with a light main frame of this type, since it offers increased velocity and reduces the usual strains and twists upon the main frame. Since I have made use of leaf springs for supporting the main frame and these leaf springs are connected by shackles to the truck members, it is found advisable to employ a separate transverse connection between opposite truck members. This is illustrated in Fig. 14 wherein I show a tubular shaft 30, upon which the truck frames are journaled by means of sleeves 31. Thereby the truck members are allowed to rock independently of each other and are held in parallel relation. This latter feature, however, is not claimed herein, being shown and described in detail in another application.

Various changes in the construction and arrangement of the several parts herein shown and described may be employed without departing from the spirit of my invention as disclosed in the appended claims.

Having thus described my invention, what I claim and desire to secure by Letters Patent is—

1. In a vehicle, a main frame having a body portion formed of pressed steel with a longitudinally extending concavity continuous from end to end, said body portion serving to enclose the driving and operating parts of the tractor at the bottom thereof, a transversely extending reinforcing member at each end of said body portion detachably connected thereto and a cross sill arranged intermediate the ends of the body portion and detachably connected thereto at the bottom thereof.

2. In a vehicle, a main frame having a body portion formed of pressed steel with a longitudinally extending concavity continuous from end to end, said body portion serving to enclose the driving and operating parts of the tractor at the bottom thereof, a transversely extending reinforcing member at each end of the frame detachably connected thereto and separate transverse members within the concave portion serving as supports for the engine and associated parts.

3. In a vehicle, a main frame having a body portion formed of pressed steel with a longitudinally extending concavity continuous from end to end, separate transverse members within the concave portion serving as supports for the engine and associated parts and a reinforcing member connected to the transverse members and extending longitudinally of the concave portion to form side supports for the engine and associated parts.

4. In a vehicle, a main frame having a body portion formed of pressed steel in the shape of a trough, the sides of which diverge from front to rear and side and end pieces for said body reinforcing the latter.

5. In a vehicle, a main frame formed of pressed steel comprising a central body portion curved transversely and a separate curved band secured to the rear end of said body portion and provided with flanges whereby to permit a transmission housing to be attached thereto.

In testimony whereof I have hereunto set my hand in the presence of two subscribing witnesses.

EMIL F. NORELIUS.

Witnesses:
    Louis B. Neumiller,
    Fred Grotts.